(12) United States Patent
Newton et al.

(10) Patent No.: US 6,318,812 B1
(45) Date of Patent: Nov. 20, 2001

(54) VENT VALVE FOR ELECTROPNEUMATIC BRAKE CONTROL VALVE

(75) Inventors: Ronald O. Newton; Steven R. Newton, both of Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/661,638

(22) Filed: Sep. 13, 2000

(51) Int. Cl.[7] ........................................ B60T 11/34
(52) U.S. Cl. ................... 303/82; 303/86; 303/68; 303/33; 303/81; 303/36; 303/15
(58) Field of Search ........................ 303/28, 33, 3, 303/37, 36, 38, 7, 15, 86, 81, 82, 69, 68, 29, 30, 39, 57, 73, 74

(56) References Cited

U.S. PATENT DOCUMENTS

| | | |
|---|---|---|
| 4,014,580 | 3/1977 | Bridigum . |
| 4,026,609 | 5/1977 | Bridigum . |
| 4,974,911 | 12/1990 | Hart . |
| 5,096,266 | 3/1992 | Skantar . |
| 5,207,482 * | 5/1993 | Hart et al. ............................ 303/82 |
| 5,350,222 * | 9/1994 | Carroll ................................. 303/82 |
| 5,501,513 | 3/1996 | Gayfer . |
| 5,503,467 | 4/1996 | Gaughan . |
| 5,967,620 | 10/1999 | Truglio et al. . |

* cited by examiner

Primary Examiner—Douglas C. Butler
(74) Attorney, Agent, or Firm—Barnes & Thornburg

(57) ABSTRACT

A vent valve made from a standard emergency brake valve portion. It includes an emergency portion body with an interface to be mated with the emergency portion interface of the pipe bracket. The body includes a casting with at least one cover and the casting including all the cast cavities and passages for an emergency portion. A vent valve selectively connects a first brake pipe port to a vent port on the body, A vent piston controls the vent valve and a discharge valve pneumatically controls the vent piston. An emergency piston is responsive to brake pipe pressure for controlling the discharge valve. The body does not include at least one of an in shot valve and an accelerated application valve.

28 Claims, 6 Drawing Sheets

VENT VALVE FOR ELECTROPNEUMATIC BRAKE CONTROL VALVE

BACKGROUND AND SUMMARY OF THE INVENTION

The present invention relates generally to vent valves and vent valves specifically designed for use in electropneumatic brake control valves.

Electropneumatic brake control valves are well known in the passenger railroad art and the mass transit railroad art. Because the trains are short and are not involved generally in a mix and match at an interchange of different equipment, the ability to provide pneumatic and electrical control throughout the train has been readily available in the passenger and the mass transit systems. In freight trains, the trains may involve as much as 100 cars stretching over one mile or more. The individual cars may lay idle in harsh environments for up to a year without use. Also, because of the long distance they travel, the cars are continuously moved from one consist to another as it travels to its destination. Thus, the use of electropneumatic-pneumatic valves in the freight trains has been very limited.

Recently, electropneumatic brake control valves have been introduced for freight trains. A typical example is the EP-60® available from New York Air Brake Corporation and illustrated in U.S. Pat. No. 5,967,620 to Truglio et al.

An overlay system of the prior art is illustrated in FIG. 1 herein which shows a car control device 40 connected between the emergency portion 20 and the pipe bracket 30. A service portion 10 is also connected to the pipe bracket 30. The connection of the car control device 40 to the pipe bracket 30 at the service interface and a vent valve 54 on the emergency interface of the prior art is illustrated in FIG. 2 herein. The vent valve 54 is a KM-2 available from New York Air Brake Corporation and Knorr-Bremse AG. The car control device 40 on the service interface of pipe bracket 30 has been used with a full emergency section portion 20 on the emergency interface as illustrated in FIG. 3. FIGS. 2 and 3 are considered stand alone and not overlay systems as in FIG. 1 in that the car control device 40 performs an electropneumatic operation of the vehicle brakes with a pneumatic emergency application if the car control device 40 fails. The purpose of the vent valve 54 and the emergency portion 20 in the stand alone is to vent the brake pipe in an emergency situation thereby propagating the emergency condition in the brake pipe. This will also cause the pneumatic portion of the car control device 40 to apply the car brakes.

The KM-2 vent valve has a slower transmission rate than the standard emergency portion 20 of a pneumatic valve. To compensate for this, the emergency brake cylinder build up rates were increased to maintain the stop distance required. This resulted in increase in-train forces which are undesirable.

The use of a standard pneumatic emergency portion 20, illustrated in FIG. 3 in the stand alone as a vent valve, also has its drawbacks. The accelerated application portion of the emergency portion 20 when used with the CCD 40 causes an operational problem in which the valve will waste air by venting in response to minor fluctuations in brake pipe during normal EP brake operations. It should be noted that during EP brake operation, the brake pipe should be fully charged. Minor variations do occur. The brake pipe fluctuation comes about on release and recharge of the brake pipe which in turn replaces reservoir air used during the previous brake application. This is monitored by the valves in the emergency portion 20 which causes undesired venting of brake pipe, by the elements in the emergency brake portion 20 thus wasting air and slowing the recharge process.

Also, the inshot portion of the emergency brake valve portion 20 provides a two-stage build up of brake cylinder pressure. Although being required in a totally pneumatic system, it limits the use of the electropneumatic brake control valve to a single car set because of the pneumatic capacity. It would take too long to build up the pressure in both car sets.

The present invention is a vent valve to be used with a brake control valve having a pipe bracket with an emergency portion interface. The vent valve includes an emergency portion body with an interface configured to mate with the emergency portion interface of the pipe bracket. The body includes the vent valve for selectively connecting a first brake pipe port to a vent port in the body and a vent piston controlling the vent valve. The vent piston has a first side connected to a volume port in the pipe bracket. The body also includes a discharge valve selectively connecting the second side of the vent piston to either the vent port or a volume port at the interface. An emergency piston controls the discharge valve and includes a first side connected to the volume port and the second side connected to a second brake pipe port at the interface. These are standard elements of the emergency portion. The body does not include at least one of the inshot valve and an acceleration application valve. The removal of the inshot valve allows acceptable application of the multiple brake set and the absence of the acceleration application valve prevents undesirable air loss.

The body includes a casting with at least one cover. The casting includes all cavities and passages of a standard emergency portion. The cover for the vent valve and inshot cavity includes only the passage connecting the first side of the vent valve to the volume port. The cavities for the accelerated application valve and the an emergency auxiliary release valve in the casting remain plugged. The body also does not include a high pressure valve which was included as part of the original vent valve/inshot valve cover. The body does include an accelerated application sensor valve operated by the emergency piston and does not include an accelerated application valve. The discharge valve and the accelerated application sensor valve are poppet valves in line with the emergency piston.

The vent valve formed from a standard emergency portion is used in an electropneumatic brake for a railroad vehicle. It is attached to the pipe bracket at the emergency interface of a pipe bracket. An electropneumatic car brake control device is mounted on the service interface of the pipe bracket. The pipe bracket includes the volume connected to the volume port at the emergency interface.

A method of converting a standard emergency brake valve portion includes removing at least one of the inshot valve and the accelerated application valve and then plugging the corresponding cavity. It also includes removing an emergency accelerated release valve and plugging its cavity. It may also include removing the high pressure valve and plugging its cavity.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
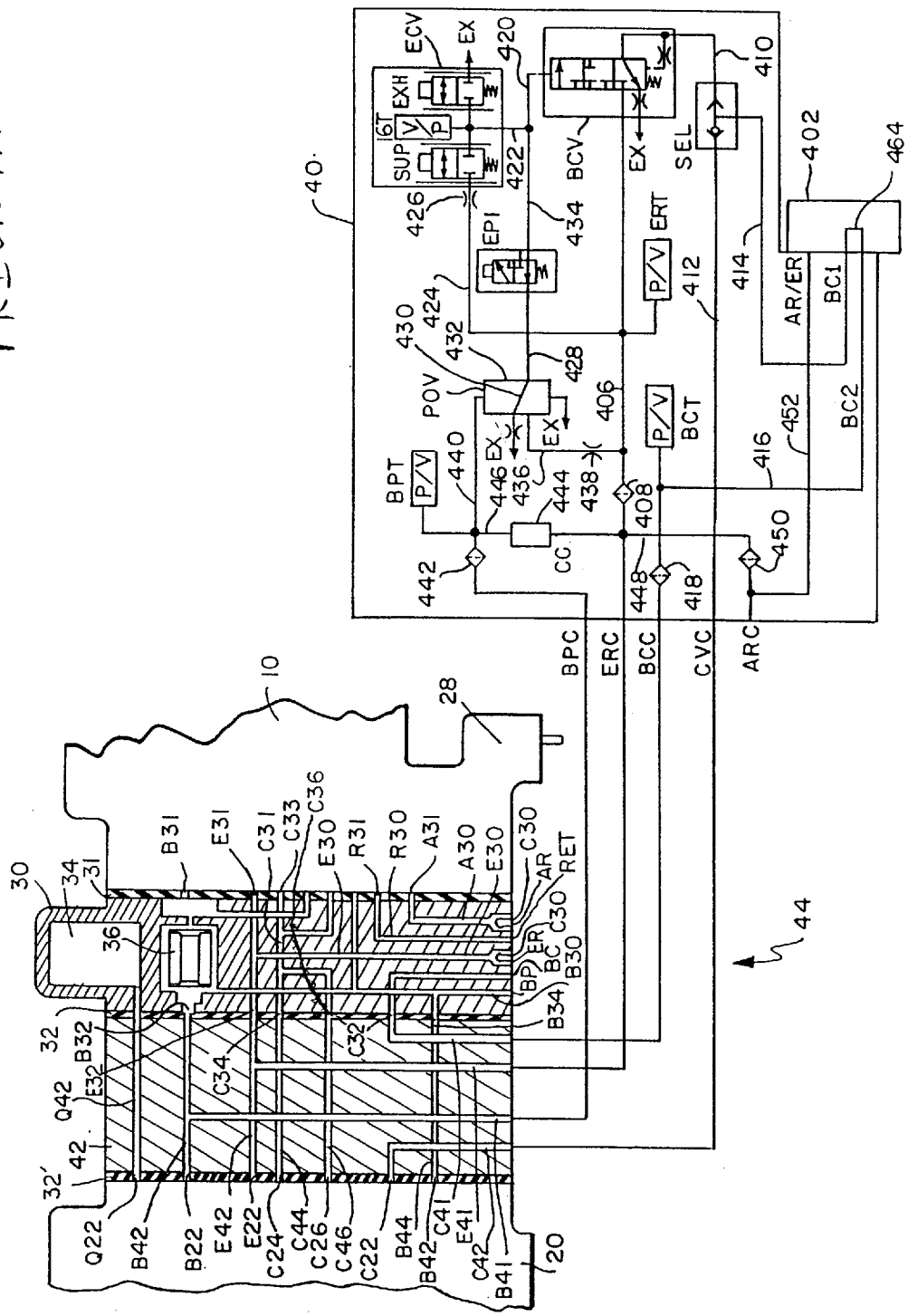
FIG. 1 is a schematic of an overlay electropneumatic system having a car control device overlaying a pneumatic brake control valve having a service portion and emergency portion mounted to a pipe bracket according to the prior art.
Figure 2:
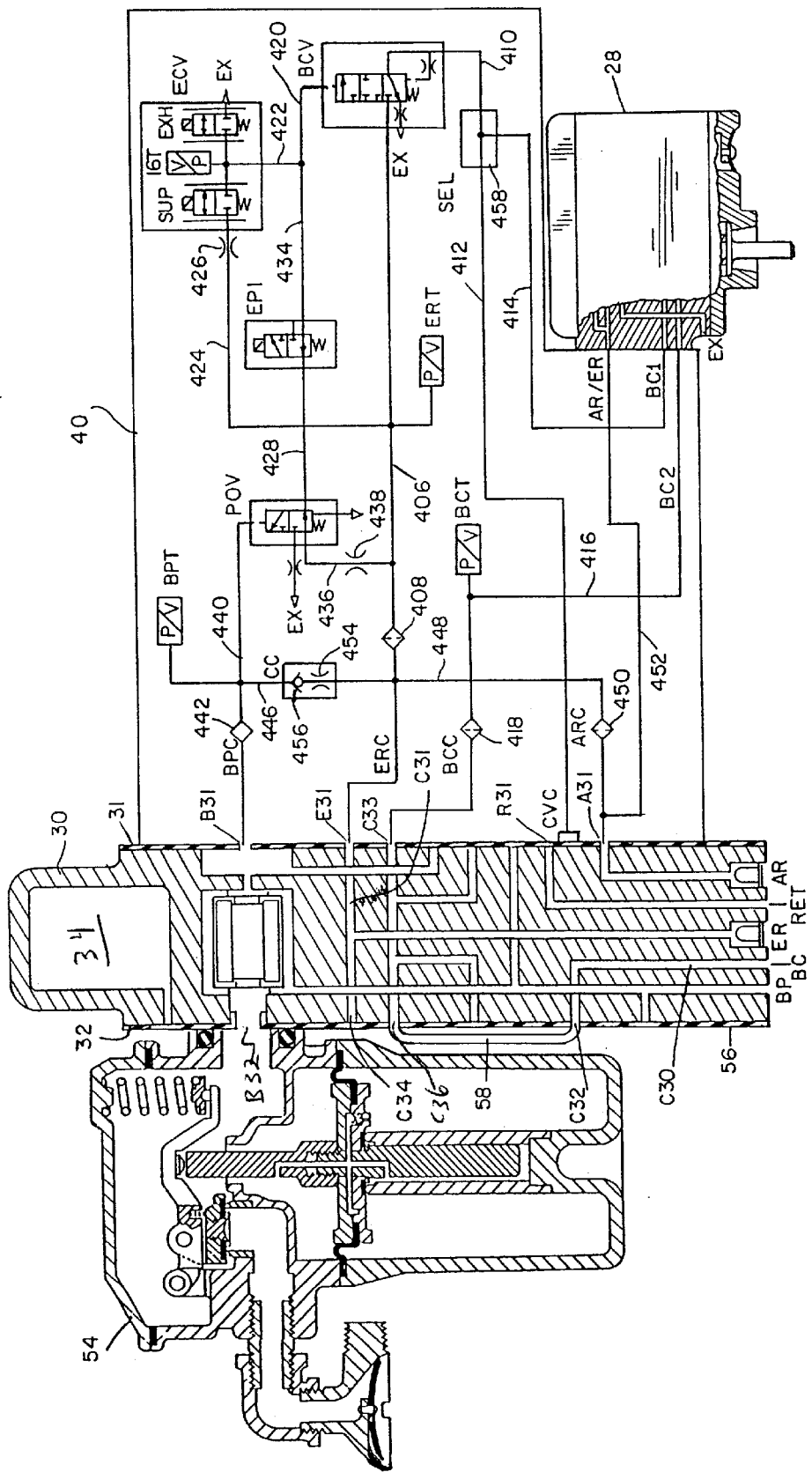
FIG. 2 is a schematic representation of a stand alone electropneumatic system with a car control device and a vent valve mounted to a pipe bracket according to the prior art.
Figure 3:
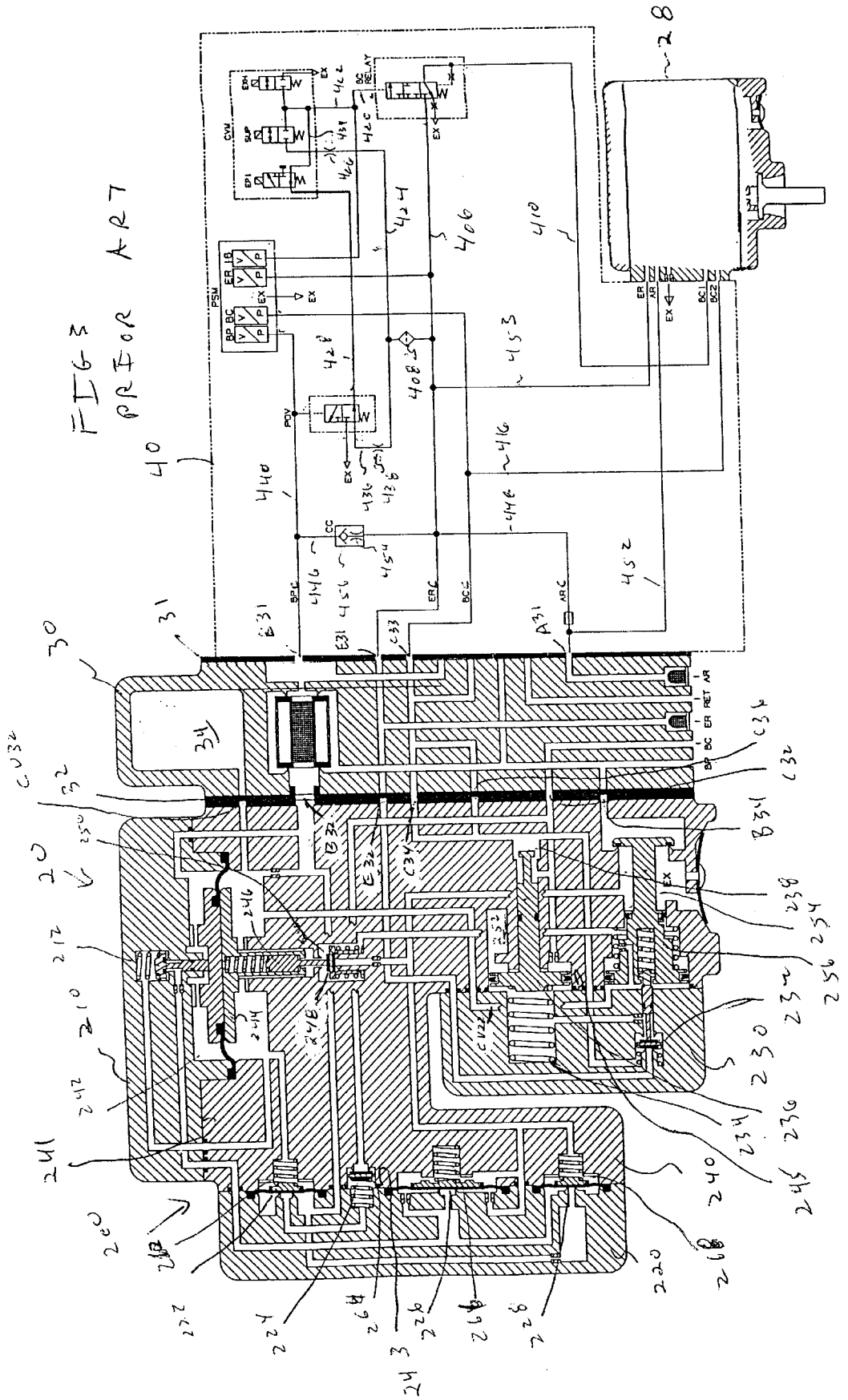
FIG. 3 is a schematic representation of a stand alone electropneumatic brake having a car control device and an emergency portion connected to a pipe bracket according to the prior art.

FIGS. 1–3 show an electropneumatic car control valve according to the prior art. Whereas FIG. 1 is an overlay system, FIGS. 2 and 3 are stand alone electropneumatic brake valve systems. The overlay system of FIG. 1 includes a car control device 40 and is connected to a pipe standard pipe bracket 30 at interface 32 by an adaptor plate 42. A standard service portion 10 is mounted to the pipe bracket 30 at interface 31 and a standard emergency portion 20 is connected to the adaptor plate 40 at interface 32'. The brake control valve will operate in a pneumatic mode using service portion 10 and an emergency portion 20. In an electromagnetic mode, the car control device 40 will control the braking of the brake cylinder.

FIG. 2 shows an electropneumatic brake control valve of the prior art in a stand alone mode. The car control device 40 is mounted to the service interface 31 of the pipe bracket 30. A vent valve 54, shown as a KM-2, is mounted to the emergency interface 32. The vent valve 54 vents the brake pipe for a sensed emergency condition in the brake pipe. The car control device 40 operates in an electropneumatic mode to control the brake cylinder pressure and has a pneumatic mode for an emergency application of the brakes only.

The electropneumatic brake control valves of FIGS. 1 and 2 are shown in FIGS. 2A and 2C of U.S. Pat. No. 5,967,620 to Truglio et al. which is incorporated herein by reference.

FIG. 3 shows the car control device 40 connected at the service interface 31 of the pipe bracket 30 with a complete emergency portion 20 mounted to the emergency interface 32. The car control device 40 is the same as that shown in FIGS. 1 and 2 with minor modifications. Passage 453 connects the emergency reservoir passage 406 to the release portion 28. Also, the EPI valve has been combined into a control valve module CVM with the supply and exhaust valves. A pressure sensor module PSM has collected the brake pipe sensor, the brake cylinder sensor, the emergency reservoir sensor and the 16 sensors into a single unit. The select valve SEL has been eliminated.

To aid in understanding the various passages within the control valve, the brake pipe passage is represented by a "B", the brake cylinder passages by a "C", the emergency reservoir passages by an "E", the retainer passage by an "R", the auxiliary reservoir passage by a "A", and the control valve or brake signal passage from the emergency portion for the brake cylinder by a "V". The passages in the service portion 10 will have a number in the teens, the passages in the brake pipe 30 will have numbers in the 20's, and the passages in the retrofit adaptor plate 42 will have reference numbers in the 40's.

The emergency portion 20 is shown as the emergency portion of a DB60, known as DB20 available from New York Air Brake Corporation. Although this will be used as an example, the emergency portion 20 may also be the emergency portion of ABDX or any other AAR approved brake valve.

The emergency portion 20 includes a body 200 having covers 210, 220 and 230 mounted on faces 241, 243 and 245 of a casting 240. The cover 210 includes passages and a cavity for an accelerated application in the sensor valve 212.

The cover 220 includes cavities and passages for an emergency acceleration release valve 222, an emergency acceleration release check valve 224, a pulsating valve 226 and a brake pipe discharge valve 228. The pulsating valve 226 and the brake pipe discharge valve 228 form an accelerated application valve.

The cover 230 includes passages and cavities for a high pressure valve 232 and the spring portion 234 of an inshot valve 236. Valve portion 238 of the inshot valve 236 defines the two stage build up of the brake cylinder.

The casting 240 includes a cavity 242 in face 241 for an emergency piston 244. The emergency piston 244 is connected by lost motion arrangement 246 to discharge valve 248 in cavity 250. The inshot valve 236 is in cavity 252 in face 245 of the casting 240. Cavity 254 also in face 245 is provided for a vent valve 256. The cover 230 covers the cavities 252 for the inshot valve 236 and cavity 254 for the vent valve 256. The casting 240 includes cavities 262, 264, 266 and 268 in face 243. For the emergency acceleration release valve 262, the emergency acceleration release check valve 264, pulsating valve 266 and the discharge valve 268 of the accelerated application valve. These cavities are covered by cover 220 and are bored into the face 243 of casting to connect with the internal passages which are part of the casting 240. The other cavity described are part of the casting and are not bored.

As is well known, the emergency piston 244 has brake pipe pressure on its top surface via brake pipe interface port B32. The bottom of the emergency piston is connected at control volume interface port CV32 to a control volume 34 in the pipe bracket 30, known in the industry as a "quick action chamber". The change of the brake pipe pressure changes the position of the emergency piston 244. The emergency piston 244 operates the accelerated application sensor 212. It also operates the discharge valve 248 through the lost motion apparatus 246.

The vent valve 256 selectively connects the brake pipe and brake pipe interface port B34 to exhaust. The left side of the piston portion of the vent valve 256 is connected to the control volume towards port CV32. The right side of the vent valve is selectively connected by the discharge valve 248 to the either the vent port or the control volume port CV32. In response to an emergency pressure drop in the brake pipe, the emergency piston 244 operates discharge valve 248 to move the vent valve 256 to open and connect the brake pipe port B34 to exhaust.

The inshot valve 236 is shown in the position for a service application thereby allowing the brake cylinder port C32 to have unrestricted flow. In an emergency application, the high pressure valve 232 changes position from that shown, which allows the inshot valve 236 to move to the left causing the end 238 to be restricted and thereby slow down the build up of the brake cylinder pressure at port C32 during its first stage. After given a period of time, the inshot valve 236 is move back to the right for unrestricted flow. This two stage build up is standard to prevent different cars of the train coming on to full emergency brake before others start braking. This restriction of flow prevents the use of the emergency portion 20 of FIG. 3 from being used to drive more than one car set form the brake cylinder port BC.

The pulsating valve 226 and the discharge valve 238 of the accelerated application valve are responsive to the acceleration application sensor valve 212 to connect the brake pipe port B32 to exhaust at chamber 254. This accelerates the signal of the brake pipe as well as the operation of the emergency piston 244. The fully charged brake pipe drops in pressure when the reservoirs are charged. This is sensed by the piston 244 and the accelerated application system vents the brake pipe thinking braking is being requested. This wastes brake pipe air and extends the time it takes to recharge the reservoir on the car.

Figure 4:
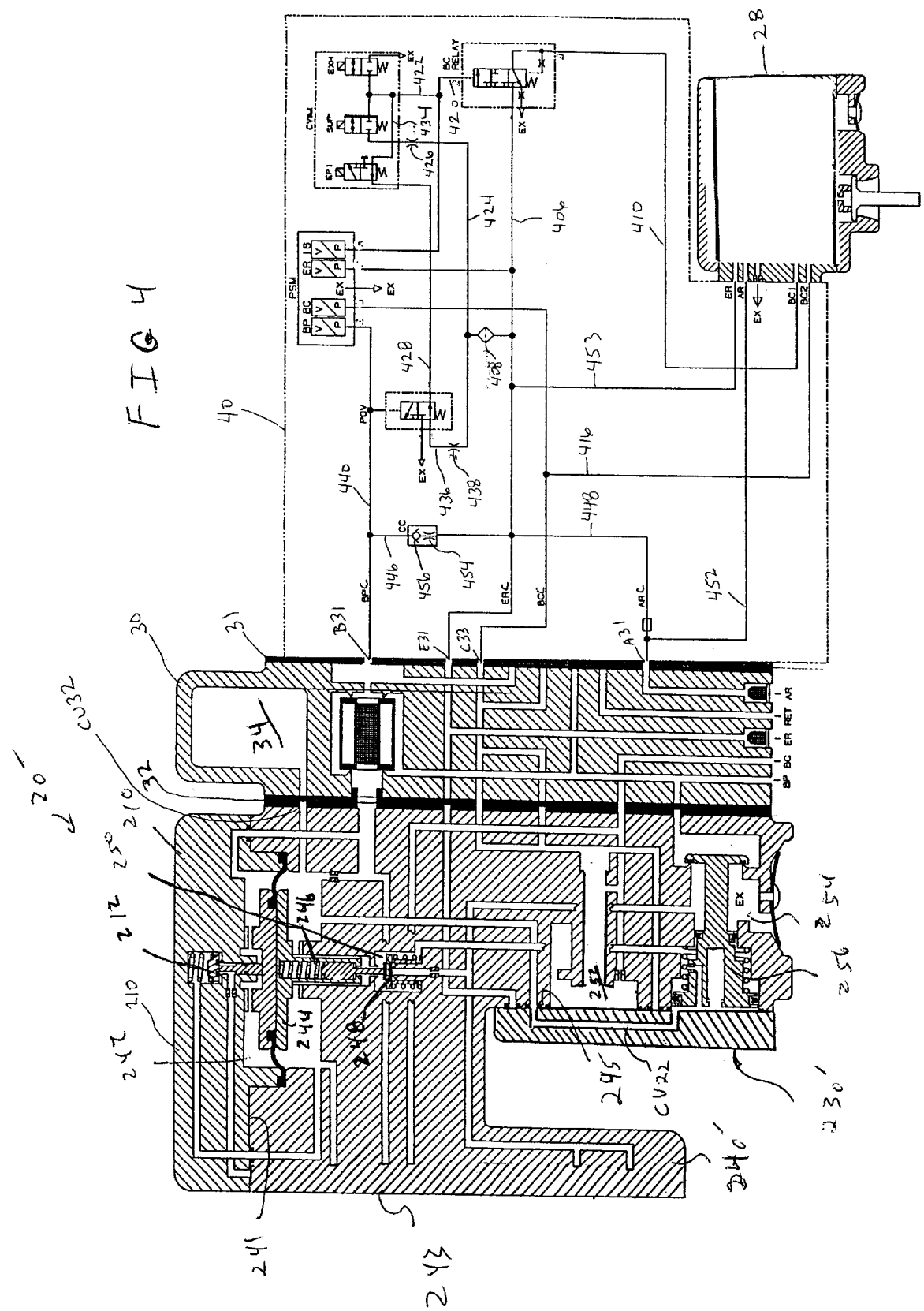
FIG. 4 is a schematic representation of a stand alone electropneumatic valve having a car control device connected to a pipe bracket and a modified emergency portion vent valve according to the principles of the present invention.

A vent valve of the present invention is illustrated in FIG. 4. The car control device is that of FIG. 3. The vent valve 20' is a standard casting 240 of an emergency section having all the cast cavities and passages of the emergency portion. By using a standard body, no adaptor or modification is needed at the interface 32 and the standard studs are used for mounting to the pipe bracket 30. The casting 240 includes cavity 240 for the emergency piston 244, cavity 250 for the discharge valve 248, cavity 252 for the inshot valve 236 and cavity 254 for the vent valve 256.

Although the passages are shown for the emergency acceleration release 222, the emergency acceleration release check valve 224, the pulsating valve 226 and the brake pipe discharge valve 228, the cavities 262, 264, 266 and 268 are not bored into the face 243 of the casting 240'. Thus, the emergency acceleration release valve 222, the emergency acceleration release check valve 224, the pulsating valve 226 and the brake pipe discharge valve 228 are not provided. The removal of the acceleration application valves removes the venting of brake pipe by fluctuation of the brake pipe in the electropneumatic mode.

Also, the inshot valve 236 has been deleted as well as the high pressure valve 232. The cavity 252 for the inshot valve has not been deleted since they are part of the standard casting 240. If economics permit, the mold for the casting could be modified to delete cavity 252.

Cover 210 includes the acceleration application sensor valve 212. Cover 220 is not needed since the passages adjacent interface 243 are plugged in the standard casting 240. Cover 230 has been modified to only include the passage CV22 from the quick action chamber 34 to the left side of the vent valve 256.

As previously discussed by eliminating the inshot valve 236, there is no restriction on the flow to the brake cylinder interface port C32. Thus, the total valve illustrated in FIG. 4 may drive more than one brake cylinder set. The brake cylinder relay has the capacity to drive more than one brake cylinder set whereas the standard pneumatic brake valve does not. If the brake control valve is to be used with only a single set, the inshot valve 236 and associated hardware may be in the body. Having a different brake control valve for single and multiple sets is commercially undesirable.

Although the multistage build up is not needed in electropneumatic braking since all are applied simultaneously, the brake cylinder build up can be defined in software. The response time and the capacity of the emergency portion in the vent valve provided is an improvement over the vent valve of FIG. 2.

It should be noted that the accelerated application sensor valve 212 has no function in the vent valve 20 but is still provided to maintain the sensitivity and operation of the in-line stack which includes acceleration application sensor valve 212, the emergency piston 244 and the discharge valve 248. Elimination of the accelerated application sensor valve 212 would require balancing of the stack. It should be noted that the acceleration application valve 212 and the discharge valve 248 are poppet valves. The piston 244 and the discharge valve 248 may be replaced by a slide valve mechanism responsive to brake pipe pressure for controlling the vent valve 256 in response to an emergency condition in the brake pipe.

Although the vent valve 20' has been described as being made from a casting 240 without boring the necessary cavities for the acceleration application valves, a standard emergency portion 20 and casting 240 as in FIG. 3 may also be modified to create the vent valve according to the present invention. This would be removing plate 220 and/or moving the portions of acceleration release valve 222, the emergency acceleration release check valve 224, the pulsating 226 and the discharge valve 228. The cavities 262, 264, 266 and 268 would then be plugged. Similarly, the cover 230 would be removed to remove the inshot valve 252 and the high pressure valve 232. The chambers in the cover 230 would then be plugged. This would produce the equivalent of the emergency portion vent valve 20' shown in FIG. 4.

Figure 5:
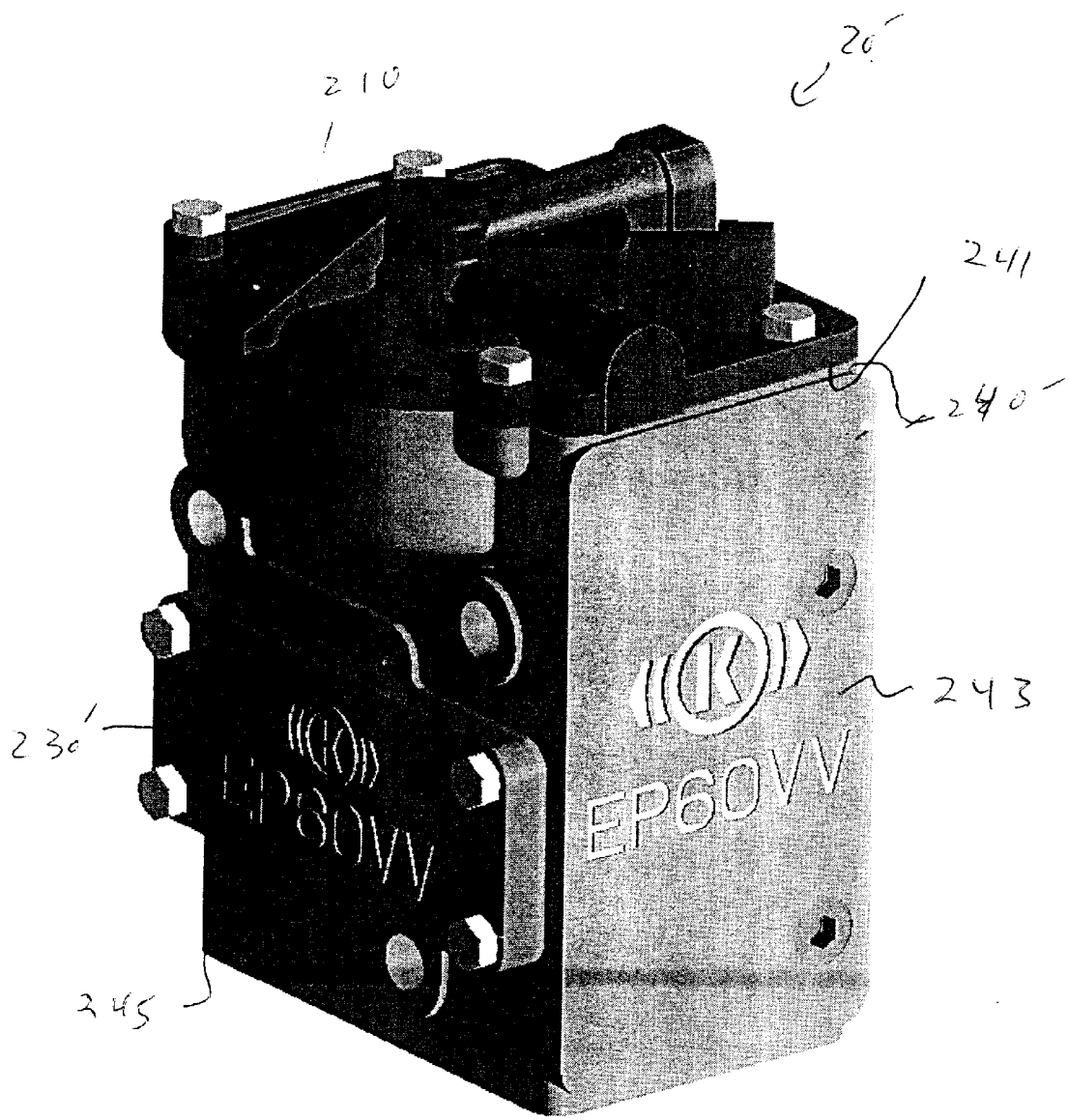
FIG. 5 is a perspective view of a vent valve according to the present invention.
Figure 6:
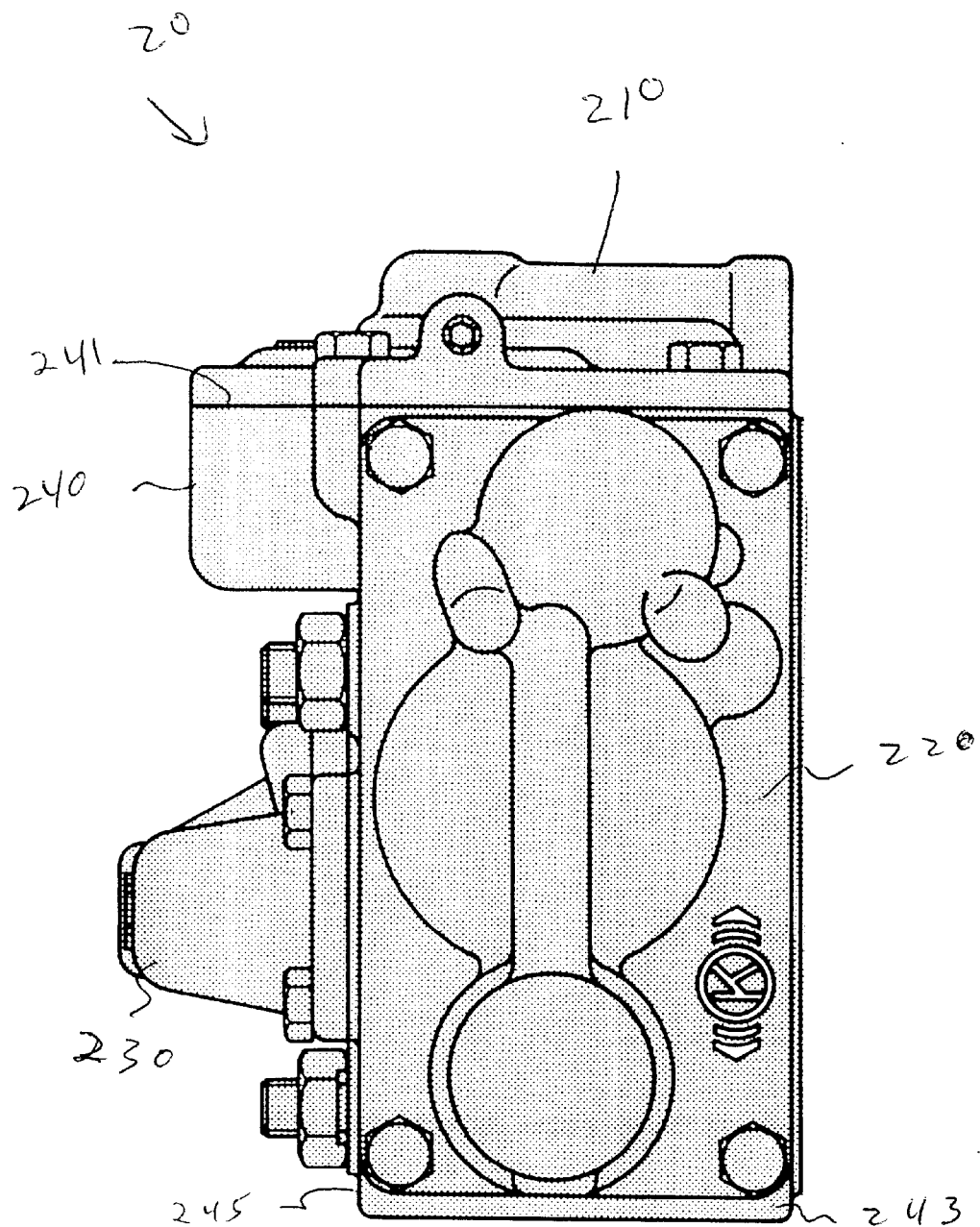
FIG. 6 is a side view of an emergency portion of the prior art.

FIG. 5 shows a perspective view of the vent valve 220' according to the present invention. The casting 240 is smooth at the face 243 with the old cover 220 eliminated. The new cover 230' is shown at face 245 as well as the standard cover 210 at face 241. This is compared to the standard emergency portion illustrated in FIG. 6. It includes the casting 240 with covers 210, 220 and 230 at faces 241, 243 and 245.

In summary, the vent valve of the present invention provides pneumatic emergency backup in a stand-alone installation with sensitivity, transmission time, resistance to UDEs (undesirable emergency) and low in-train forces as good as or better than that provided by the DB-20 Emergency valve. During a normal EP-60® emergency brake application, the primary emergency control is ECP, which provides almost instantaneous transmission time, and uniform brake cylinder build-up throughout the train, resulting in short stop distances and low in-train forces. The back-up pneumatic emergency must also be high-performance in the event, a pneumatic emergency application is required.

The present vent valve uses the proven DB-60® CCD in stand-alone applications, providing high-performance brake sensitivity, transmission time, and resistance to UDEs, while eliminating the problematic and unneeded features.

Although the present invention has been described and illustrated in detail, it is to be clearly understood that the same is by way of illustration and example only, and is not to be taken by way of limitation. The vent valve of the present invention may be also used at the emergency portion interface of a single sided pipe bracket. The spirit and scope of the present invention are to be limited only by the terms of the appended claims.

What is claimed:

1. A vent valve to be used with a brake control valve having a pipe bracket with an emergency portion interface, the vent valve comprising:

an emergency portion body with an interface configured to be mated with the emergency portion interface of the pipe bracket, the interface including first and second brake pipe ports and a volume port;

a vent valve selectively connecting the first brake pipe port to a vent port on the body;

a vent piston controlling the vent valve, the vent piston including a first side connected to the volume port and a second side;

a discharge valve selectively connecting the second side of the vent piston to either the vent port or the volume port;

an emergency piston controlling the discharge valve, the emergency piston including a first side connected to the volume port and a second side connected to the second brake pipe port; and the body not including at least one of an inshot valve and an accelerated application valve.

2. The vent valve according to claim 1, including an inshot cavity in the body without an inshot valve.

3. The vent valve according to claim 2, wherein the body includes a casting with at least one cover, the casting includes all the cast cavities and passages for an emergency portion; and the cover for the vent valve piston and inshot cavity includes only a passage connecting the first side of the vent piston to the volume port.

4. The vent valve according to claim 1, wherein the body includes a casting with at least one cover, the casting includes all the cast cavities and passages for an emergency portion; and the cover for the vent valve piston includes only a passage connecting the first side of the vent piston to the volume port.

5. The vent valve according to claim 4, wherein cavities for the accelerated application valve and an emergency accelerated release valve in the casting remain plugged.

6. The vent valve according to claim 1, wherein the body does not include the accelerated application valve and an emergency accelerated release valve.

7. The vent valve according to claim 6, wherein the body includes a casting with at least one cover, the casting includes all the cast cavities and passages for an emergency portion and cavities for the accelerated application valve and the emergency accelerated release valve in the casting remain plugged.

8. The vent valve according to claim 7, wherein the body does not include a high pressure valve; and the cover for the vent valve piston includes only a passage connecting the first side of the vent piston to the volume port.

9. The vent valve according to claim 1, the body includes a casting with at least one cover, the casting includes all the cast cavities and passages for an emergency portion and cavities for the accelerated application valve and an emergency accelerated release valve in the casting remain plugged.

10. The vent valve according to claim 1, wherein the body includes an accelerated application sensor valve operated by the emergency piston and does not included the accelerated application valve.

11. The vent valve according to claim 10, wherein the discharge valve and the accelerated application sensor valve are poppet valves in-line with the emergency piston.

12. The vent valve according to claim 1, wherein the discharge valve is a poppet valve in-line with the emergency piston.

13. A vent valve to be used with a brake control valve having a pipe bracket with an emergency portion interface, the vent valve comprising:

an emergency portion body with an interface configured to be mated with the emergency portion interface of the pipe bracket, the interface including first and second brake pipe ports and a volume port;

the body including a casting with at least one cover, the casting including all the cast cavities and passages for an emergency portion;

a vent valve selectively connecting the first brake pipe port to a vent port on the body;

a vent piston controlling the vent valve, the vent piston including a first side connected to the volume port and a second side;

a discharge valve selectively connecting the second side of the vent piston to either the vent port or the volume port;

an emergency piston controlling the discharge valve, the emergency piston including a first side connected to the volume port and a second side connected to the second brake pipe port; and the cover for the vent valve piston including only a passage connecting the first side of the vent piston to the volume port.

14. The vent valve according to claim 13, wherein cavities for an accelerated application valve and an emergency accelerated release valve in the casting remain plugged.

15. The vent valve according to claim 13, wherein the body includes an accelerated application sensor valve operated by the emergency piston and does not included an accelerated application valve.

16. The vent valve according to claim 15, wherein the discharge valve and the accelerated application sensor valve are poppet valves in-line with the emergency piston.

17. A vent valve to be used with a brake control valve having a pipe bracket with an emergency portion interface, the vent valve comprising:

an emergency portion body with an interface configured to be mated with the emergency portion interface of the pipe bracket, the interface including first and second brake pipe ports and a volume port;

the body including a casting with at least one cover, the casting including all the cast cavities and passages for an emergency portion;

a vent valve selectively connecting the first brake pipe port to a vent port on the body;

a vent piston controlling the vent valve, the vent piston including a first side connected to the volume port and a second side;

a discharge valve selectively connecting the second side of the vent piston to either the vent port or the volume port;

an emergency piston controlling the discharge valve, the emergency piston including a first side connected to the volume port and a second side connected to the second brake pipe port; and a cavity for an accelerated application valve in the casting remains plugged.

18. The vent valve according to claim 17, wherein a cavity for an emergency accelerated release valve in the casting remains plugged.

19. An electro-pneumatic brake for a rail vehicle including a pipe brake with an emergency interface and a service interface, an electropneumatic car brake control device mounted on the service interface and a vent valve on the emergency interface, the vent valve comprising:

an emergency portion body with an interface mated with the emergency portion interface of the pipe bracket, the interface including first and second brake pipe ports and a volume port;

the body including a casting with at least one cover, the casting including all the cast cavities and passages for an emergency portion;

a vent valve selectively connecting the first brake pipe port to a vent port on the body;

a vent piston controlling the vent valve, the vent piston including a first side connected to the volume port and a second side;

a discharge valve selectively connecting the second side of the vent piston to either the vent port or the volume port;

an emergency piston controlling the discharge valve, the emergency piston including a first side connected to the volume port and a second side connected to the second brake pipe port; and the body not including at least one of an inshot valve and an accelerated application valve.

20. The brake according to claim 19, wherein the cover for the vent valve piston includes only a passage connecting the first side of the vent piston to the volume port.

21. The brake according to claim 19, including a volume in the pipe bracket connected to the volume port.

22. The brake according to claim 19, wherein cavities for the accelerated application valve and an emergency accelerated release valve in the casting remain plugged.

23. The brake according to claim 19, wherein the body includes an accelerated application sensor valve operated by the emergency piston and does not included an accelerated application valve.

24. The brake according to claim 23, wherein the discharge valve and the accelerated application sensor valve are poppet valves in-line with the emergency piston.

25. The brake according to claim 19, wherein the discharge valve is a poppet valve in-line with the emergency piston.

26. A method of converting an emergency brake valve portion which includes an emergency portion body with an interface to be mated with the emergency portion interface of the pipe bracket; the body including a casting with at least one cover, the casting including all the cast cavities and passages for an emergency portion; a vent valve selectively connecting a first brake pipe port to a vent port on the body; a vent piston controlling the vent valve; a discharge valve pneumatically controlling the vent piston; an emergency piston responsive to brake pipe pressure for controlling the discharge valve; an inshot valve connected to a brake cylinder port, an accelerated application valve connecting a second brake pipe port to the vent port, the method comprising the steps of:

removing at least one of an inshot valve and an accelerated application valve; and plugging its cavity.

27. The method of claim 26, wherein the housing includes an emergency accelerated release valve and including removing the emergency accelerated release valve and plugging its cavity.

28. The method of claim 26, wherein the housing includes a high pressure valve and including removing a high pressure valve and plugging its cavity.

* * * * *